United States Patent
Zhang et al.

(10) Patent No.: US 11,870,701 B2
(45) Date of Patent: Jan. 9, 2024

(54) DATA TRANSMISSION METHOD, SWITCH, AND SITE

(71) Applicant: HUAWEI TECHNOLOGIES CO., LTD., Guangdong (CN)

(72) Inventors: Yu Zhang, Beijing (CN); Xuefeng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 17/562,115

(22) Filed: Dec. 27, 2021

(65) Prior Publication Data

US 2022/0124041 A1 Apr. 21, 2022

Related U.S. Application Data

(63) Continuation of application No. PCT/CN2019/093872, filed on Jun. 28, 2019.

(51) Int. Cl.
*H04L 47/2425* (2022.01)
*H04L 12/46* (2006.01)
(Continued)

(52) U.S. Cl.
CPC ...... *H04L 47/2433* (2013.01); *H04L 12/4633* (2013.01); *H04L 45/123* (2013.01);
(Continued)

(58) Field of Classification Search
CPC ............. H04L 47/2433; H04L 12/4633; H04L 45/123; H04L 45/586; H04L 47/2483;
(Continued)

(56) References Cited

U.S. PATENT DOCUMENTS

| 7,042,880 B1 | 5/2006 | Voit et al. |
| 10,177,936 B2 * | 1/2019 | Banavalikar .......... H04L 41/122 |

(Continued)

FOREIGN PATENT DOCUMENTS

| CN | 1708034 A | 12/2005 |
| CN | 1866947 A | 11/2006 |

(Continued)

OTHER PUBLICATIONS

Yang Bo et al.,"Implementation Improvement of IP Multicast on Routing Switches and Research on Accounting Strategy",10.3969/j.issn.1002-5316.2005.11.006, Modern Science and Technology of Telecommunications, 2005, with an English abstract, total 7 Pages.

(Continued)

*Primary Examiner* — Wutchung Chu

(57) ABSTRACT

A data transmission method for to a data center including a first site and a second site is disclosed. According to the data transmission method, after obtaining a first data packet sent by a virtual machine at the first site, a switch at the first site identifies a service type of the first data packet, and determines routing information of the first data packet based on the service type of the first data packet; and after determining the routing information, the switch sends the first data packet based on the routing information, where the routing information is used to indicate a bearer link for transmitting the first data packet, and a link through which the first data packet is transmitted to the second site is the bearer link. In this way, the first data packet may be transmitted through a link that corresponds to the service type of the first data packet.

18 Claims, 8 Drawing Sheets

(51) Int. Cl.
  *H04L 45/12* (2022.01)
  *H04L 45/586* (2022.01)
  *H04L 47/2483* (2022.01)
  *H04L 49/35* (2022.01)
  *H04L 49/00* (2022.01)

(52) U.S. Cl.
  CPC ........ *H04L 45/586* (2013.01); *H04L 47/2483* (2013.01); *H04L 49/35* (2013.01); *H04L 49/70* (2013.01)

(58) Field of Classification Search
  CPC ..... H04L 49/35; H04L 49/70; H04L 12/4641; H04L 45/306
  See application file for complete search history.

(56) References Cited

U.S. PATENT DOCUMENTS

| | | | |
|---|---|---|---|
| 10,999,219 B1 * | 5/2021 | Athreyapurapu | ... H04L 41/0806 |
| 11,159,389 B1 * | 10/2021 | Miriyala | ............... H04L 41/142 |
| 2005/0220059 A1 | 10/2005 | Delregno et al. | |
| 2005/0220107 A1 | 10/2005 | Delregno et al. | |
| 2013/0088969 A1 | 4/2013 | Mukherjee et al. | |
| 2015/0124815 A1 * | 5/2015 | Beliveau | ................. H04L 45/38 370/392 |
| 2015/0281120 A1 * | 10/2015 | Sindhu | ................. H04L 47/805 709/226 |
| 2016/0262073 A1 | 9/2016 | Muley et al. | |
| 2016/0323193 A1 * | 11/2016 | Zhou | ....................... H04L 69/22 |
| 2016/0381175 A1 * | 12/2016 | Wu | ......................... H04L 69/22 709/240 |
| 2017/0134538 A1 * | 5/2017 | Mahkonen | ......... H04L 12/4633 |
| 2018/0176308 A1 | 6/2018 | Tsai et al. | |
| 2018/0337849 A1 * | 11/2018 | Sharma | ............. H04L 65/1069 |
| 2020/0014619 A1 * | 1/2020 | Shelar | ................. H04L 43/087 |
| 2020/0106744 A1 * | 4/2020 | Miriyala | ............... H04L 41/142 |
| 2020/0296011 A1 * | 9/2020 | Jain | ...................... H04L 43/026 |
| 2022/0116353 A1 * | 4/2022 | Mathew | ................. H04L 45/64 |

FOREIGN PATENT DOCUMENTS

| | | | | |
|---|---|---|---|---|
| CN | 101102273 A | 1/2008 | | |
| CN | 101212391 A | 7/2008 | | |
| CN | 101388845 A | 3/2009 | | |
| CN | 102710468 A | 10/2012 | | |
| CN | 103581018 A | 2/2014 | | |
| CN | 103650424 A | 3/2014 | | |
| CN | 103763195 A | 4/2014 | | |
| CN | 103841024 A | 6/2014 | | |
| CN | 103947165 A | 7/2014 | | |
| CN | 102893559 B | * 7/2015 | ......... | H04L 12/4633 |
| CN | 105357099 A | 2/2016 | | |
| CN | 105812272 A | 7/2016 | | |
| CN | 105812495 A | 7/2016 | | |
| CN | 107078955 A | 8/2017 | | |
| CN | 107819697 A | 3/2018 | | |
| CN | 108880999 A | 11/2018 | | |
| CN | 109150720 A | 1/2019 | | |
| KR | 101897539 B1 | 9/2018 | | |

OTHER PUBLICATIONS

Notice of Allowance issued in CN201980006605.2, dated May 30, 2022, 5 pages.

Huang Jun et al., "Differentiate CMTS Broadband Service Based on option 82 System Construction of Nanjing CATV", China Digital Cable TV ,1007-7022( 2016) 12-1368-04, with an English abstract, total 4 pages.

Office Action issued in CN201980006605.2, dated Mar. 3, 2022, 9 pages.

International Search Report and Written Opinion issued in PCT/CN2019/093872, dated Apr. 3, 2020, 8 pages.

Office Action issued in CN201980006605.2, dated Jun. 22, 2021, 7 pages.

* cited by examiner

DATA TRANSMISSION METHOD, SWITCH, AND SITE

CROSS-REFERENCE TO RELATED APPLICATIONS

This application is a continuation of International Application No. PCT/CN2019/093872, filed on Jun. 28, 2019, the disclosure of which is hereby incorporated by reference in its entirety.

TECHNICAL FIELD

This application relates to the field of information technologies, and in particular, to a data transmission method, a switch, and a site.

BACKGROUND

Services provided by a cloud computing vendor include a central cloud service and an edge cloud service that are deployed at different sites. The two services serve a user based on data interaction and collaboration between the sites. For example, an edge cloud service deployed at a site close to a data source quickly and conveniently obtains data from the data source, processes the obtained data, and provides the processed data to a central cloud service at another site, so that the central cloud service performs subsequent processing.

Transmission quality of data between sites is a key factor that affects quality of service. To ensure the transmission quality, customer-premises equipment (CPE) is deployed at each site, to implement data transmission between different sites. Currently, a site that provides an edge cloud service is usually deployed in an existing equipment room near a data source, for example, an access equipment room. Such an equipment room has limited space, and provides limited power consumption. Deploying a CPE when space and power consumption are limited greatly increases difficulty of deploying the edge cloud service.

SUMMARY

Example embodiments of this application provide a data transmission method, a switch, and a site, to resolve a problem that it is difficult to deploy an edge cloud service due to configuration of CPE.

According to a first aspect, an embodiment of this application provides a data transmission method. The method is applied to a data center. The data center includes a first site and a second site. At least two links are established between the first site and the second site, and each link may correspond to at least one service type. A process in which a switch at the first site transmits a first data packet of a virtual machine at the first site to the second site is as follows:

The switch at the first site first obtains the first data packet sent by the virtual machine at the first site, then identifies a service type of the first data packet, and determines routing information of the first data packet based on the service type of the first data packet, where the routing information is used to indicate a bearer link for transmitting the first data packet. After determining the routing information, the switch sends the first data packet based on the routing information, where a link through which the first data packet is transmitted to the second site is the bearer link.

According to the foregoing method, the switch at the first site transmits the first data packet based on the routing information of the first data packet, and the bearer link of the first data packet is determined based on the service type and is a link corresponding to the service type. In this way, the first data packet may be transmitted through the link corresponding to the service type of the first data packet. No CPE needs to be deployed at a site to select a link for transmitting a data packet across sites. This can reduce site deployment difficulty and effectively save space of an equipment room at the site, and saved space can be used to deploy more hosts or other devices, to improve a service capability of the site.

In an example embodiment, after the switch determines the routing information of the first data packet based on the service type of the first data packet, the switch may encapsulate the first data packet by encapsulating the routing information into a packet header of the first data packet. Then, the switch may send the encapsulated first data packet based on the routing information.

In the foregoing example embodiments, the switch encapsulates the data packet by adding the routing information to the encapsulated first data packet, and then forwards the encapsulated first data packet. In this case, a data packet transmitted through the link corresponding to the service type of the first data packet is the encapsulated first data packet. Further, if no CPE is deployed, the first data packet may be forwarded through the link corresponding to the service type of the first data packet.

In an example embodiment, if the switch includes a plurality of ports, and each port is connected to one of the at least two links and may be connected to the second site through one link, when the switch sends the encapsulated first data packet, the switch may determine a forwarding port of the encapsulated first data packet based on the routing information. The forwarding port is one of the plurality of ports of the switch. Then, the switch may forward the encapsulated first data packet through the forwarding port.

According to the foregoing method, the switch may send, through the corresponding port, the encapsulated first data packet to the link corresponding to the service type, to further save the space of the equipment room. This further reduces the site deployment difficulty, and improves a service capability of a site.

In an example embodiment, the switch includes a virtual switch and a physical switch that are at the first site. The physical switch includes a plurality of ports, and each port may be connected to one of the at least two links. A process in which the virtual switch and the physical switch cooperate to transmit the first data packet is as follows: The virtual switch first obtains the first data packet from the virtual machine, identifies the service type of the first data packet, determines the routing information of the first data packet based on the service type of the first data packet, encapsulates the first data packet by encapsulating the routing information into a packet header of the first data packet, and then sends the encapsulated first data packet to the physical switch. After receiving the first data packet, the physical switch determines a forwarding port of the encapsulated first data packet based on the routing information, where the forwarding port is one of the plurality of ports of the physical switch, and forwards the encapsulated first data packet through the forwarding port.

According to the foregoing method, the virtual switch forwards the encapsulated first data packet to the physical switch, and the physical switch sends, through the corresponding forwarding port, the encapsulated first data packet to the link corresponding to the service type. A physical switch is usually deployed in an equipment room at a site. If no CPE is deployed, the first data packet may be transmitted through a corresponding link when an existing physical switch in the equipment room is used.

In an example embodiment, the switch may include a virtual switch and a physical switch that are at the first site. The physical switch includes a plurality of ports, and each port may be connected to one of the at least two links. A process in which the virtual switch and the physical switch cooperate to transmit the first data packet is as follows: The virtual switch first receives the first data packet from the virtual machine, after identifying the service type of the first data packet, determines the routing information of the first data packet based on the service type of the first data packet, and then sends the routing information and the first data packet together to the physical switch. After receiving the first data packet and the routing information, the physical switch encapsulates the first data packet based on the routing information, determines a forwarding port of the encapsulated first data packet based on the routing information, and forwards the encapsulated first data packet through the forwarding port.

According to the foregoing method, the virtual switch forwards the routing information and the first data packet to the physical switch, and the physical switch encapsulates the first data packet, and sends, through the corresponding forwarding port, the encapsulated first data packet to the link corresponding to the service type. A physical switch is usually deployed in an equipment room at a site. If no CPE is deployed, the first data packet may be transmitted through a corresponding link when an existing physical switch in the equipment room is used.

In an example embodiment, the data center further includes a controller. The controller stores configuration information of the links between the first site and the second site and a connection relationship between internal devices at each site. The controller may control the switch by delivering a forwarding table to the switch. In addition, the switch may actively send a query request to the controller. For example, when determining the routing information of the first data packet based on the service type of the first data packet, the switch may send the query request to the controller, where the query request carries the service type of the first data packet; and the switch determines the routing information of the first data packet by receiving a query response returned by the controller.

According to the foregoing method, when determining the routing information of the first data packet, the switch may obtain the routing information from the controller, to further ensure that the first data packet can be transmitted to the second site through the link corresponding to the service type.

In an example embodiment, after identifying a destination address of the first data packet, the switch may add the destination address of the first data packet to the query request.

According to the foregoing method, when determining the routing information of the first data packet, the switch may obtain the routing information from the controller by notifying the controller of the destination address and the service type of the first data packet, to further ensure that the first data packet can be transmitted to the second site through the link corresponding to the service type.

In an example embodiment, before sending the first data packet based on the routing information, the switch may encrypt the first data packet, and set different encryption policies for different service types. For example, the switch may determine an encryption policy based on the service type, and then encrypt the first data packet according to the encryption policy.

According to the foregoing method, the switch may encrypt the first data packet, to ensure security of the first data packet.

In an example embodiment, after the switch sends the data packet based on the routing information, if a second data packet with a same service type and a same destination address is received from a same virtual machine, the switch may send the second data packet by sending only differential data, and a process is as follows: The switch determines differential data between the first data packet and the second data packet, and sends the differential data based on the routing information in a same manner as sending the first data packet, where the differential data is transmitted to the second site through the bearer link.

According to the foregoing method, for a plurality of data packets with a same service type, a same destination address, and a same source address, the switch may send only differential data different from that in the first data packet, to effectively improve data transmission efficiency.

According to a second aspect, an embodiment of this application further provides a switch. For beneficial effects, refer to the description in the first aspect. The switch has a function of implementing an action in the method example in the first aspect. The function may be implemented by hardware, or may be implemented by hardware executing corresponding software. The hardware or software includes one or more modules corresponding to the foregoing function. In an example embodiment, a structure of the apparatus includes a receiver, a processor, and a transmitter. The units may execute corresponding functions in the method example in the first aspect. For details, refer to the detailed descriptions in the method example.

According to a third aspect, an embodiment of this application further provides a switch. For beneficial effects, refer to the description in the first aspect. A structure of the switch includes a processor and a memory. The processor is configured to support the switch to execute corresponding functions in the method in the first aspect. The memory is coupled to the processor, and stores a program instruction and data that are necessary for the switch. The structure of the switch further includes a plurality of ports, configured to communicate with another device.

According to a fourth aspect, an embodiment of this application further provides a first site. The first site includes a virtual machine and a switch. For beneficial effects, refer to the description in the first aspect. The switch executes a corresponding function in any one of the first aspect or the possible designs of the first aspect.

According to a fifth aspect, this application further provides a computer-readable storage medium. The computer-readable storage medium stores an instruction, and when the instruction is run on a computer, the computer is enabled to perform the methods in the foregoing aspects.

According to a sixth aspect, this application further provides a computer program product including an instruction. When the computer program product runs on a computer, the computer is enabled to perform the methods in the foregoing aspects.

According to a seventh aspect, this application further provides a computer chip. The chip is connected to a memory. The chip is configured to read and execute a software program stored in the memory, to perform the methods in the foregoing aspects.

DESCRIPTION OF EMBODIMENTS

Figure 1:
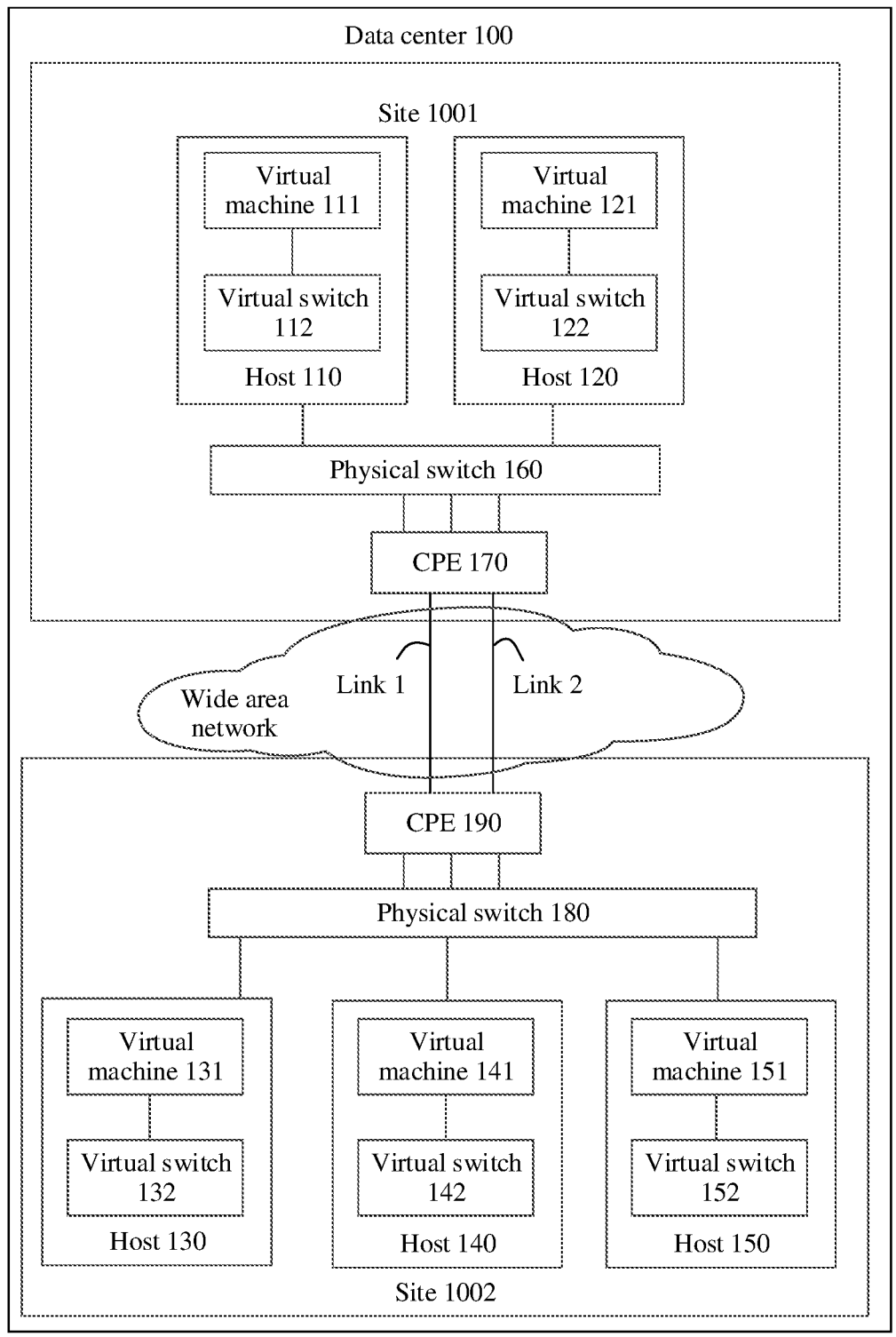
FIG. 1 is an architectural diagram of a data center according to an embodiment of this application.

Example embodiments of this application provide a data transmission method, a switch, and a site, to resolve a problem that configuration of CPE increases deployment difficulty of an edge site. The method and the apparatus in this application are based on a same inventive concept.

The method and the apparatus have similar problem resolving principles. Therefore, for implementation of the apparatus and the method, mutual reference may be made.

The following describes name terms used in the present disclosure.

(1) Site: In the embodiments of this application, a site indicates a set of devices. The device at the site provides a service based on data generated by a data source. The data source may be a device inside or outside the site. Generally, a site that is far from the data source is referred to as a central site, and a site that is close to the data source is referred to as an edge site. A data center usually includes a plurality of sites.

(2) Service: A service includes but not is limited to a computing service, a storage service, and a network service. Any device or function that can be accessed by a user can be considered as a service provided by a data center. The service may be provided based on a device at a site, or may be provided based on devices at a plurality of sites. This is not limited in the embodiments of this application. Generally, a service deployed at a central site is referred to as a central service or a central cloud service, and a service deployed at an edge site is referred to as an edge service or an edge cloud service.

(3) Wide area network (WAN): A wide area network is also referred to as an external network or a public network. In the embodiments of this application, devices at different sites communicate with each other through the WAN.

(4) Link: A link is also referred to as a dedicated line or a private line. In the embodiments of this application, the link indicates a physical link that bears a WAN between sites. The link in the embodiments of this application includes but is not limited to an internet, a multi-protocol label switching virtual private network (MPLS VPN), a 5th-generation mobile communications technology (5th-Generation, 5G) network, a 4th-generation mobile communications technology (4th-Generation, 4G) network, or the like.

(5) Payload: A data packet includes a packet header and a payload. The payload is used to carry valid data in the data packet, for example, service data. The packet header is used to carry some auxiliary information that describes the valid data, for example, a data volume and a parity bit of the valid data. In the embodiments of this application, a service type of the data packet is a service type of data carried in the payload of the data packet. The two expressions are equivalent, and are not distinguished in the embodiments of this application. In addition, a service identifier carried in the data packet may indicate the service type of the data packet.

(6) Routing information: In the embodiments of this application, routing information may be an address (for example, an address 1) used for encapsulating a data packet, and a device indicated by the address 1 is a device on a link corresponding to a service type. Alternatively, the routing information may be other information indicating a link, for example, a link identifier.

(7) In descriptions of this application, terms such as "first" and "second" are merely intended for a purpose of differentiated description, and shall not be understood as an indication or an implication of relative importance, or an indication or an implication of a sequence. In the embodiments of the present invention, "a plurality of" means two or more.

(8) A term "and/or" describes an association relationship between associated objects and represents that three relationships may exist. For example, A and/or B may represent the following three cases: Only A exists, both A and B exist, and only B exists.

A data center 100 in FIG. 1 is used as an example to describe an architecture of a data center in an embodiment of this application. In FIG. 1, a site 1001 and a site 1002 are used as an example. The site 1001 and the site 1002 may be two central sites or two edge sites. Alternatively, the site 1001 and the site 1002 may be an edge site and a central site respectively.

The site 1001 includes at least one host on which a virtual switch runs. For example, two hosts at the site 1001 are used in FIG. 1, which are respectively a host 110 and a host 120. A virtual machine and a virtual switch run on the host. For example, a virtual machine 111 and the virtual switch 112 are deployed on the host 110, and a virtual machine 121 and the virtual switch 122 are deployed on the host 120. A quantity of virtual machines running on the host is not limited in this embodiment of this application. In FIG. 1, only an example in which one virtual machine is deployed on each host is used. In a specific application, a quantity of virtual machines deployed on the host may be set according to a requirement. In addition to the hosts on which the virtual switches run, the site 1001 may further include a host on which no virtual machine and no virtual switch run. For example, a host on which no virtual machine and no virtual switch are deployed may be used as a management host to manage another host at the site 1001, or used to provide a service with a high requirement on security or computing performance.

Optionally, as shown in FIG. 1, a physical switch 160 and CPE 170 may be further deployed at the site 1001. For example, only one physical switch and one CPE are used in FIG. 1. In this embodiment of this application, one or more physical switches may be deployed at the site, and one or more CPEs may also be deployed at the site. The physical switch 160 is connected to each host at the site 1001, and forwards a data packet between the hosts and between the hosts and the CPE. The CPE 170 is separately connected to the physical switch 160 and a WAN, receives the data packet from the physical switch 160, and forwards the received packet to the site 1002 through the WAN.

Similar to a structure of the site 1001, the site 1002 includes at least one host on which a virtual switch runs, and a deployed virtual machine also runs on the host. In FIG. 1, an example in which the site 1002 includes three hosts is used. The three hosts are respectively a host 130, a host 140, and a host 150. A virtual machine 131 and a virtual switch 132 are deployed on the host 130. A virtual machine 141 and a virtual switch 142 are deployed on the host 140. A virtual machine 151 and a virtual switch 152 are deployed on the host 150. Although not shown in FIG. 1, a host on which no virtual machine is deployed may be included by the site 1002. For a function of the host on which no virtual machine is deployed, refer to the foregoing content. Optionally, the site 1002 may further include a physical switch 180 and CPE 190.

The devices at the site 1001 and at the site 1002 communicate with each other through the WAN between the CPE170 and the CPE190. There may be one or more links for bearing the WAN, and the site 1001 and the site 1002 may communicate with each other through one link or a plurality of different links. When data carried in a payload of the data packet has a different service type, a link applicable to forwarding the data packet in the WAN may be different. A communication service, a video service, and an email service are used as an example. The communication service requires clear call quality, short transmission duration, and a short data interval, and therefore a data packet of the communication service is usually applicable to a link with a relatively short transmission delay. The video service features a large transmission data amount, and therefore a data packet of the video service is applicable to a link with higher bandwidth. Compared with the communication service, the email service has a relatively low requirement on transmission delay, and usually only needs to ensure successful transmission within a time range, and the internet can meet the requirement of the service. Data packets of one or more service types can be transmitted between the site 1001 and the site 1002. Each data packet corresponds to one or more links between the site 1001 and the site 1002.

Based on the site 1001 and the site 1002 shown in FIG. 1, the following describes a data transmission method by using a process in which the virtual machine 111 at the site 1001 sends a data packet 1 to the virtual machine 131 at the site 1002 as an example.

In a process of transmitting the data packet 1, the virtual machine 111 sends the data packet 1 to the virtual switch 112 on the host 110. A destination device of the data packet 1 is the virtual machine 131 at the site 1002, and a destination address carried in the data packet 1 is an address of the virtual machine 131. The virtual switch 112 identifies, based on the destination address carried in the data packet 1, that the destination device of the data packet 1 is located at the site 1002; and the virtual switch 112 forwards the data packet 1 to the physical switch 160. After receiving the data packet 1, the physical switch 160 sends the data packet 1 to the CPE 170. As a last device that the data packet 1 passes through before leaving the site 1001, the CPE 170 needs to select a link for the data packet 1 based on a service type of data carried in a payload of the data packet 1. Specifically, a plurality of ports on the CPE 170 are separately connected to different links. In FIG. 1, a link 1 and a link 2 are used as an example. The CPE 170 identifies the destination address of the data packet 1, determines, based on a service identifier to which the data carried in the payload of the data packet 1 belongs, a forwarding port from the plurality of ports, forwards, through the determined port, the data packet 1 to a link connected to the determined port, and then forwards the data packet 1 to the CPE 190 at the site 1002 through the link.

After receiving the data packet 1, the CPE 190 at the site 1002 transmits the data packet 1 to the physical switch 180 based on the address of the virtual machine 131 carried in the data packet 1. After receiving the data packet 1, the physical switch 180 sends the data packet 1 to the virtual switch 132 on the host 130 based on the address of the virtual machine 131. The virtual switch 132 forwards the data packet 1 to the virtual machine 131.

It can be learned from the foregoing data transmission process that, the CPE is required in data transmission between the two sites, to complete link selection. If space of an edge site is limited, configuration of the CPE increases difficulty in deploying the edge site.

Figure 2:
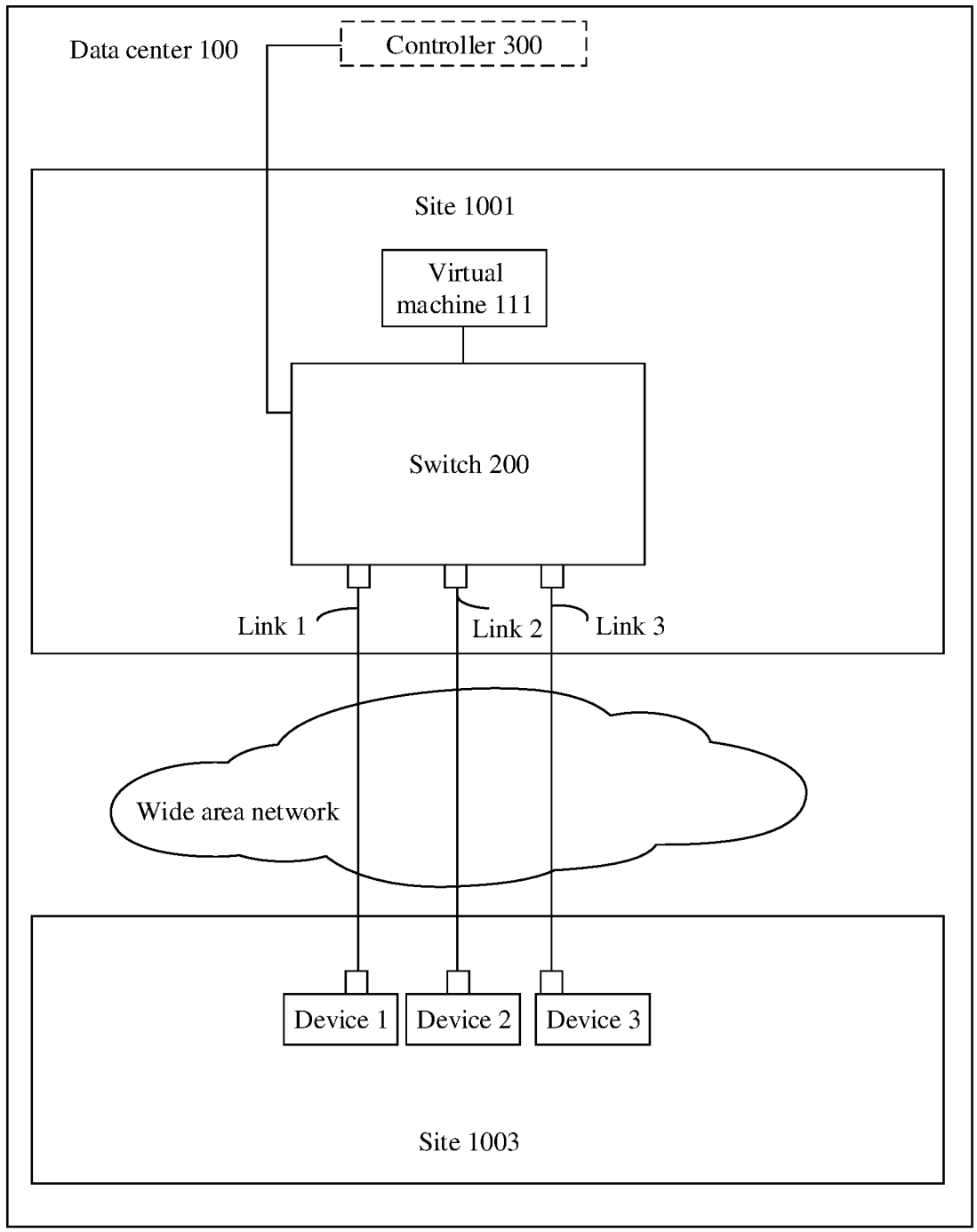
FIG. 2 is an architectural diagram of a data center according to an embodiment of this application.

Based on this, an embodiment of this application provides another architecture of a data center. As shown in FIG. 2, a data center 100 is used as an example. The data center 100 includes a site 1001 and a site 1003. FIG. 2 shows only a connection manner between a virtual machine 111 and a switch 200 that are at the site 1001. It should be understood that the site 1001 may further include another virtual machine, and for a connection manner between the another virtual machine and the switch 200, refer to the foregoing description of the connection manner between the virtual machine 111 and the switch 200 in FIG. 2.

The virtual machine 111 is connected to the switch 200, and the switch 200 is connected to a plurality of links in a WAN. There are one or more ports on the switch 200, and each port is connected to one link bearing the WAN. As shown in FIG. 2, the site 1003 is used as an example, and a link 1, a link 2, and a link 3 that bear the WAN are connected between the site 1001 and the site 1003. The link 1, the link 2, and the link 3 are respectively connected to a device 1, a device 2, and a device 3 at the site 1003. Types of the device 1, the device 2, and the device 3 are related to a specific architecture of the site 1003. This is not limited in this embodiment of this application. An optional implementation of the specific architecture of the site 1003 and the device 1, the device 2, and the device 3 are described below.

The switch 200 obtains data packets (a data packet 2, a data packet 3, a data packet 4, and a data packet 5 in this embodiment of this application) sent by the virtual machine 111, and sends the data packets to the site 1003 through links that are in a plurality of links connected to the site 1003 and that correspond to service types of the data packets.

Optionally, the site 1001 further includes a controller 300. The controller 300 is connected to the switch 200, to control the switch 200 at the site 1001.

In this embodiment of this application, the switch 200 identifies a service type of a data packet (for example, the data packet 1, the data packet 2, the data packet 3, and the data packet 4 in this embodiment of this application) sent by the virtual machine 111, determines routing information corresponding to the service type, and then sends the data packet based on the routing information, to transmit the data packet to the site 1003 through a link that corresponds to the service type and that is in the links between the site 1001 and the site 1003. Before transmitting the data packet, the switch 200 encapsulates the data packet based on the routing information.

The switch 200 may further obtain the routing information from the controller 300 by sending a query request that carries the service type (and may further carry a destination address of the data packet).

Optionally, the switch 200 can encrypt the data packet according to an encryption policy determined based on the service type of the data packet. For same data packets with same service types, same source addresses, and same destination addresses, the switch 200 may determine differential data between a subsequent data packet and a first data packet, and send the differential data in a same manner as sending the first data packet.

A type of the switch 200 is not limited in this embodiment of this application. The switch 200 may be a virtual switch at the site 1001, or may be a physical switch at the site 1001. The switch 200 may alternatively include a virtual switch and a physical switch. Two specific architectures of the site 1001 are used in FIG. 3 and FIG. 4. A site 1001 shown in FIG. 3 includes a virtual switch 112 and a physical switch 160. In this case, the switch 200 may be implemented by the virtual switch 112, or may be implemented by the physical switch 160. In addition, the switch 200 may alternatively be implemented by the virtual switch 112 and the physical switch 160 together. In a site 1001 shown in FIG. 4, the switch 200 may be implemented by a virtual switch 112.

Figure 3:
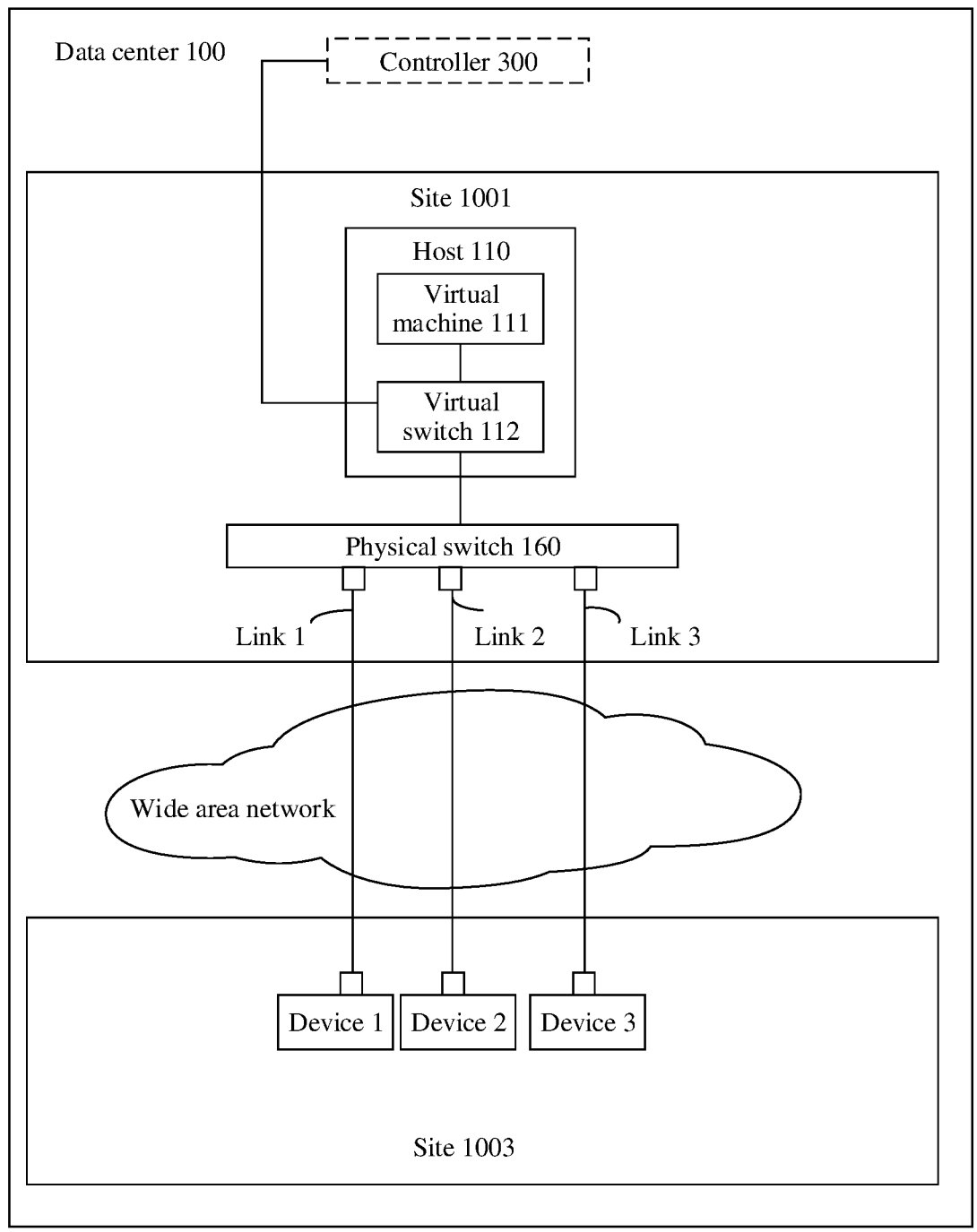
FIG. 3 is an architectural diagram of a data center according to an embodiment of this application.
Figure 4:
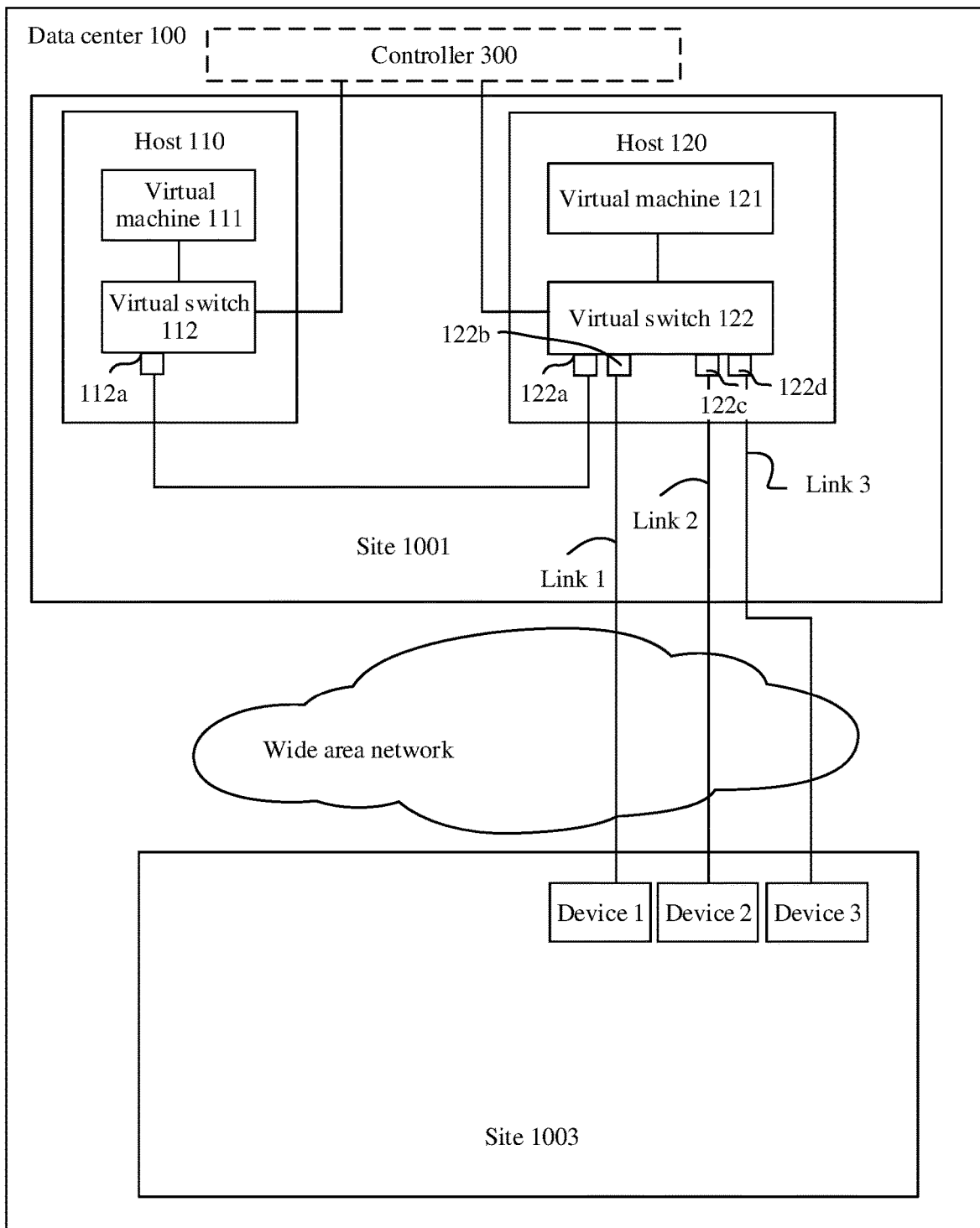
FIG. 4 is an architectural diagram of a data center according to an embodiment of this application.

The following separately describes architectures of sites 1001 in FIG. 3 and FIG. 4.

As shown in FIG. 3, an embodiment of this application provides another architecture of a data center. A data center 100 is still used as an example. The data center 100 includes a site 1001 and a site 1003. For example, FIG. 3 shows only a connection manner between a host 110 and a physical switch 160 that are at the site 1001. It should be understood that the site 1001 may further include another host. For a connection manner between the another host, the host 110, and the physical switch, refer to the foregoing descriptions of the connection manner between the host and the physical switch in FIG. 1. There are one or more ports on the physical switch 160, and each port is connected to a link bearing a WAN. As shown in FIG. 3, the site 1003 is used as an example, and a link 1, a link 2, and a link 3 that bear the WAN are connected between the site 1001 and the site 1003. The link 1, the link 2, and the link 3 are respectively connected to a device 1, a device 2, and a device 3 at the site 1003. Types of the device 1, the device 2, and the device 3 are related to a specific architecture of the site 1003. This is not limited in this embodiment of this application. The specific architecture of the site 1003 and the device 1, the device 2, and the device 3 are described below.

Optionally, a controller 300 is connected to a virtual switch at the site 1001, to implement unified control on each virtual switch at the site 1001.

The controller 300 may be deployed inside the site 1001, or may be deployed outside the site 1001. The controller 300 may control only the virtual switch at the site 1001, or may implement unified control on virtual switches at a plurality of sites.

FIG. 4 is a schematic diagram of another architecture of a data center according to an embodiment of this application. A data center 100 is still used as an example. The data center 100 includes a site 1001 and a site 1003. For example, only a host 110 and a host 120 at the site 1001 are used in FIG. 4. The hosts in the at least two hosts are directly interconnected without using a physical switch, to establish a connection between virtual switches on the hosts.

As shown in FIG. 4, each virtual switch on the host 110 and the host 120 includes one or more ports. Specifically, a virtual switch 112 includes a port 112a, and a virtual switch 122 includes a port 122a, a port 122b, a port 122c, and a port 122d. The port 112a of the virtual switch 112 is connected to the port 122a of the virtual switch 122, to connect the host 110 to the host 120, thereby implementing data exchange between the host 110 and the host 120. In addition, the ports 122b, 122c, and 122d on the virtual switch 122 are respectively connected to a link 1, a link 2, and a link 3 in a WAN. When a virtual machine 111 on the host 110 needs to access the site 1003, the virtual machine 111 sends a data packet to the virtual switch 122 on the host 120 through the port 112a and the port 122a, and then the virtual switch 122 forwards the data packet to the WAN through a corresponding link. As shown in FIG. 4, the site 1003 is used as an example, and the link 1, the link 2, and the link 3 that bear the WAN are connected between the site 1001 and the site 1003. The link 1, the link 2, and the link 3 are respectively connected to a device 1, a device 2, and a device 3 at the site 1003. Types of the device 1, the device 2, and the device 3 are related to a specific architecture of the site 1003. This is not limited in this embodiment of this application. The specific architecture of the site 1003 and the device 1, the device 2, and the device 3 are described below.

Optionally, a controller 300 is connected to the virtual switch 112 on the host 110 at the site 1001 and the virtual switch 122 on the host 120 at the site 1001. The controller 300 may implement unified control on the virtual switch 112 and the virtual switch 122 by using a forwarding flow table. The controller 300 may also deliver routing information at a request of the virtual switch 112, to control the virtual switch 112.

The controller 300 may control only the virtual switches at the site 1001, or may implement unified control on virtual switches at a plurality of sites.

For the architecture of the site 1003 in FIG. 2, FIG. 3, or FIG. 4, refer to the site 1001 in FIG. 1, FIG. 2, FIG. 3, or FIG. 4. When the site 1003 uses an architecture similar to that of the site 1001 shown in FIG. 1, the site 1003 includes at least one host, a physical switch, and a plurality of CPEs, and the device 1, the device 2, and the device 3 are all CPEs. For a connection relationship between the physical switch and each CPE, and a connection relationship between the at least one host and the physical switch, refer to the connection relationship between the host and the physical switch in FIG. 1. When the site 1003 uses an architecture similar to that of the site 1001 shown in FIG. 2, the site 1003 includes at least one switch, and the device 1, the device 2, and the device 3 may be any switch at the site 1003.

When the site 1003 uses an architecture similar to that of the site 1001 shown in FIG. 3, the site 1003 includes at least one host on which a virtual switch runs and at least one physical switch, and the device 1, the device 2, and the device 3 may be a virtual switch on any host at the site 1003, or the device 1, the device 2, and device 3 may be any physical switch at the site 1003.

When the site 1003 uses an architecture similar to that of the site 1001 shown in FIG. 4, the site 1003 includes at least one host on which a virtual switch runs, and the device 1, the device 2, and the device 3 may be any virtual switch at the site 1003.

It should be noted that the device 1, the device 2, and the device 3 that exist at the site 1003 are merely used as examples in FIG. 2, FIG. 3, and FIG. 4. When there are a plurality of links that carry the WAN between the site 1001 and the site 1003, devices connected to all the links are deployed at the site 1003.

Based on the data centers in FIG. 2 to FIG. 4, an embodiment of this application further provides a data transmission method. After receiving a data packet and identifying a service type of the data packet, a switch determines routing information (for example, information such as an address 1 and a link identifier in the following) based on the service type, forwards the data packet based on the routing information, and transmits the data packet through a link corresponding to the service type. In this way, no CPE needs to be deployed at a site to select a link. This reduces site deployment difficulty and saves space of an equipment room at the site, and saved space can be used to deploy more hosts or other devices, to improve a service capability of the site.

It should be noted that the routing information determined based on the service type may indicate a bearer link for transmitting the data packet. The bearer link of the data packet is a link that bears the data packet when the data packet is transmitted between two sites. A manner in which the routing information indicates the bearer link of the data packet is not limited in this embodiment of this application. For example, the routing information may be an address (for example, the address 1 in the following) used to encapsulate the packet, and a device indicated by the address is a device on the bearer link. Alternatively, the routing information may be identification information of the bearer link, for example, a link identifier (an identifier of a link 1 in the following) and a link number.

Figure 5:
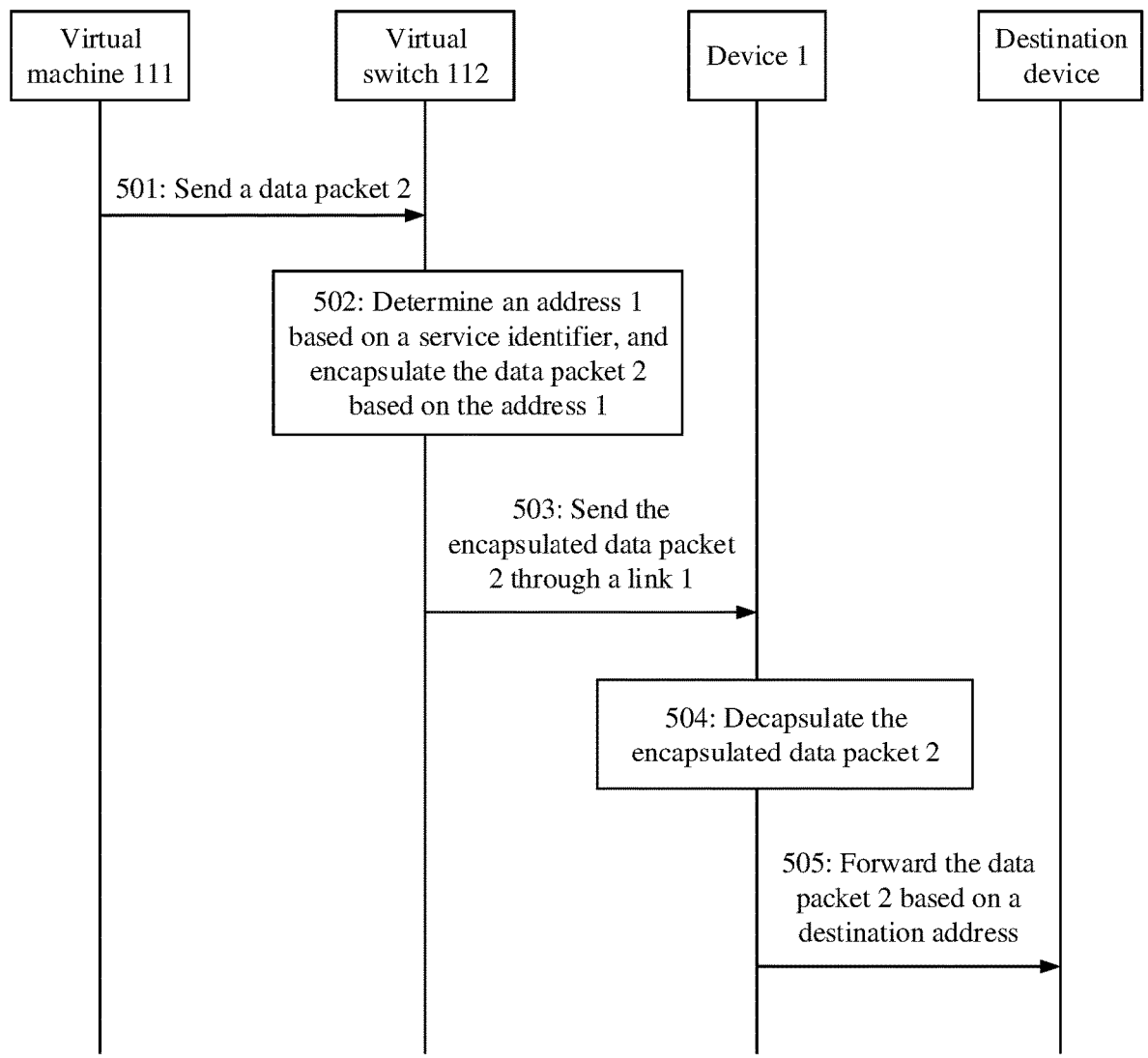
FIG. 5 is a schematic diagram of a data transmission method according to an embodiment of this application.

Specifically, another data transmission provided in this embodiment of this application is described by using an example in which a virtual switch 112 in a host 110 transmits a data packet 2 from a virtual machine 111. A service type 1 of data carried in a payload of the data packet 2 corresponds to the link 1 in FIG. 3 and FIG. 4. The data packet 2 may be forwarded to a destination device through the link 1 by using the following method. As shown in FIG. 5, the method includes the following steps.

Step 501: The virtual machine 111 sends the data packet 2 to the virtual switch 112.

The service type 1 of the data carried in the payload of the data packet 2 includes but is not limited to email, video, communication, game, work, finance, stock, and the like.

The data packet 2 further carries a source address and a destination address. The source address is an address of the virtual machine 111, and the destination address is an address of the destination device of the data packet 2. The source address and the destination address include but are not limited to an internet protocol address (IP), a media access control address (MAC) address, a port number, and the like.

Step 502: The virtual switch 112 determines a service type, namely, the service type 1, of the data packet 2, determines, based on the service type 1, an address for encapsulating the data packet 2, and encapsulates the data packet 2 based on the determined address. A packet header of the encapsulated data packet 2 carries an address, namely, the address 1, of a device 1 at a site 1003. The device 1 is connected to a site 1001 through the link 1.

The virtual switch 112 stores a correspondence between the service type 1 and the address 1. Optionally, the correspondence may be recorded in a forwarding flow table. The forwarding flow table further records a correspondence between each service identifier (the service identifier may indicate a service type) and an address. An address corresponding to each service identifier is an address of a device that is connected to the site 1001 through a corresponding link and that is at the site 1003. Optionally, the forwarding flow table of the virtual switch 112 may be generated by a controller 300 and delivered to the virtual switch 112.

Optionally, before determining the address 1 based on a service identifier, the virtual switch 112 further determines, based on the destination address of the data packet 2, that the data packet 2 needs to be transmitted across sites, in other words, determines that the virtual machine 111 and the destination device of the data packet 2 are located at different sites. In the embodiment shown in FIG. 3, if the destination device indicated by the destination address is located at the site 1003, for example, the destination address is an address of the virtual machine 111, the data packet 2 needs to be transmitted across sites, and the virtual switch 112 encapsulates the data packet 2.

Optionally, the address 1 may be determined based on the destination address of the data packet 2 and the service type of the data carried in the payload of the data packet. The forwarding flow table may further record a correspondence between a destination address of each data packet and an address, and a correspondence between a service type of data carried in a payload of the data packet and an address. In other words, when service types of data carried in payloads of two data packets are the same, but destination addresses of the two data packets are different, links corresponding to the two data packets may be different. Therefore, when the address for encapsulating the data packet 2 is determined, optionally the address for encapsulating the data packet 2 is determined based on the destination address and the service type of the data packet 2. The virtual switch 112 may determine the address 1 based on the destination address of the data packet 2 and the service type 1 by querying the forwarding flow table.

If the virtual switch 112 does not record a correspondence between the service type 1 and the address 1, the virtual switch 112 sends a query request 1 to the controller 300. The query request 1 is used to query the controller 300 for the address 1 corresponding to the service type 1, and the query request 1 may carry the service type 1 of the data packet 2. For example, the query request 1 may carry a service identifier 1, and the service identifier 1 may indicate the service type 1.

Similarly, if the address 1 is determined based on the destination address of the data packet 2 and the service type 1 of the data carried in the payload of the data packet 2, when the forwarding flow table of the virtual switch 112 does not record the correspondence between the service type 1 and the address 1, and a correspondence between the destination address of the data packet 2 and the address 1, the virtual switch 112 may alternatively send a query request 2 to the controller 300. The query request 2 is used to query the controller 300 for an address 1 corresponding to both the service type 1 and the destination address of the data packet 2. The query request 2 may carry the service type 1 of the data packet 2 and the destination address of the data packet 2.

After receiving the query request 1 or the query request 2, the controller 300 may determine the address 1 based on the service type 1 of the data carried in the payload of the data packet 2. In a possible implementation, the controller may determine the address 1 based on the service type 1 of the data carried in the payload of the data packet 2 and the destination address of the data packet 2, then add the address 1 in a query response, and feed the query response back to the virtual switch 112.

Step 503: The virtual switch 112 forwards the encapsulated data packet 2 to a corresponding link, namely, the link 1, based on the address 1.

At the site 1001 shown in FIG. 3, the virtual switch 112 may forward the encapsulated data packet 2 to the physical switch 160 based on the address 1.

After receiving the encapsulated data packet 2, the physical switch 160 may determine a port on the physical switch 160 based on the address 1, and forward the encapsulated data packet 2 through the determined port. The determined port is connected to the link 1.

In a possible implementation, the physical switch 160 stores a forwarding table. The forwarding table records a correspondence between an address and a port of the physical switch. The physical switch 160 may determine, by querying the forwarding table, the port, corresponding to the address 1, of the physical switch 160.

At the site 1001 shown in FIG. 4, the virtual switch 112 forwards the encapsulated data packet 2 to the virtual switch 122 based on the address 1. For example, the virtual switch 112 sends the encapsulated data packet 2 through the port 112*a*. For example, the forwarding flow table in the virtual switch 112 may further record a correspondence between an address and a port of the virtual switch 112, and the virtual switch may query the forwarding flow table based on the address 1 to determine the port 112*a*.

After receiving the encapsulated data packet 2, the virtual switch 122 may query a forwarding flow table in the virtual switch 122, and determine a port on the virtual switch 122 based on the address 1. The forwarding flow table records a correspondence between an address and a port of the virtual switch 122, and the forwarding flow table may be determined by the controller 300 based on a correspondence between a port of the virtual switch 122 and a link.

After determining the port 122*c*, the virtual switch 122 may forward the encapsulated data packet 2 through the determined port 122*c*.

It should be noted that a specific path for forwarding the data packet 2 through the link 1 is not limited in this embodiment of this application.

Step 504: After receiving the encapsulated data packet 2 from the corresponding link, the device 1 decapsulates the encapsulated data packet 2, to obtain the data packet 2.

Step 505: The device 1 forwards the data packet 2 to the destination device of the data packet 2 based on the destination address of the data packet 2.

For example, if the site 1003 uses the structure shown in FIG. 1, and the device 1 is the CPE 190, the CPE 190 performs decapsulation, and sends the data packet 2 to the physical switch at the site 1003 after decapsulation. The physical switch at the site 1003 sends the data packet 2 to the virtual switch at the site 1003 based on the destination address of the data packet 2, and the virtual switch at the site 1003 sends the data packet 2 to the destination device.

For example, if the site 1003 uses the structure shown in FIG. 3, the device 1 is the virtual switch at the site 1003. The encapsulated data packet 2 arrives at the virtual switch at the site 1003 through the physical switch at the site 1003. After receiving the encapsulated data packet 2, the virtual switch at the site 1003 performs decapsulation, and sends the data packet 2 to the destination device based on the destination address of the data packet 2 after decapsulation.

For example, if the site 1003 uses the structure shown in FIG. 3, the device 1 may alternatively be the virtual switch at the site 1003. The encapsulated data packet 2 arrives at the physical switch at the site 1003 through the link 1. After receiving the encapsulated data packet 2, the physical switch at the site 1003 performs decapsulation, and sends the data packet 2 to the virtual switch at the site 1003 based on the destination address of the data packet 2 after decapsulation.

Then, the virtual switch at the site 1003 sends the data packet 2 to the destination device based on the destination address of the data packet 2.

For example, if the site 1003 uses the structure shown in FIG. 4, the device 1 is the virtual switch at the site 1003. After receiving the encapsulated data packet 2, the virtual switch at the site 1003 decapsulates the received encapsulated data packet 2, and sends the data packet 2 to the destination device based on the destination address of the data packet 2 after decapsulation.

Figure 6:
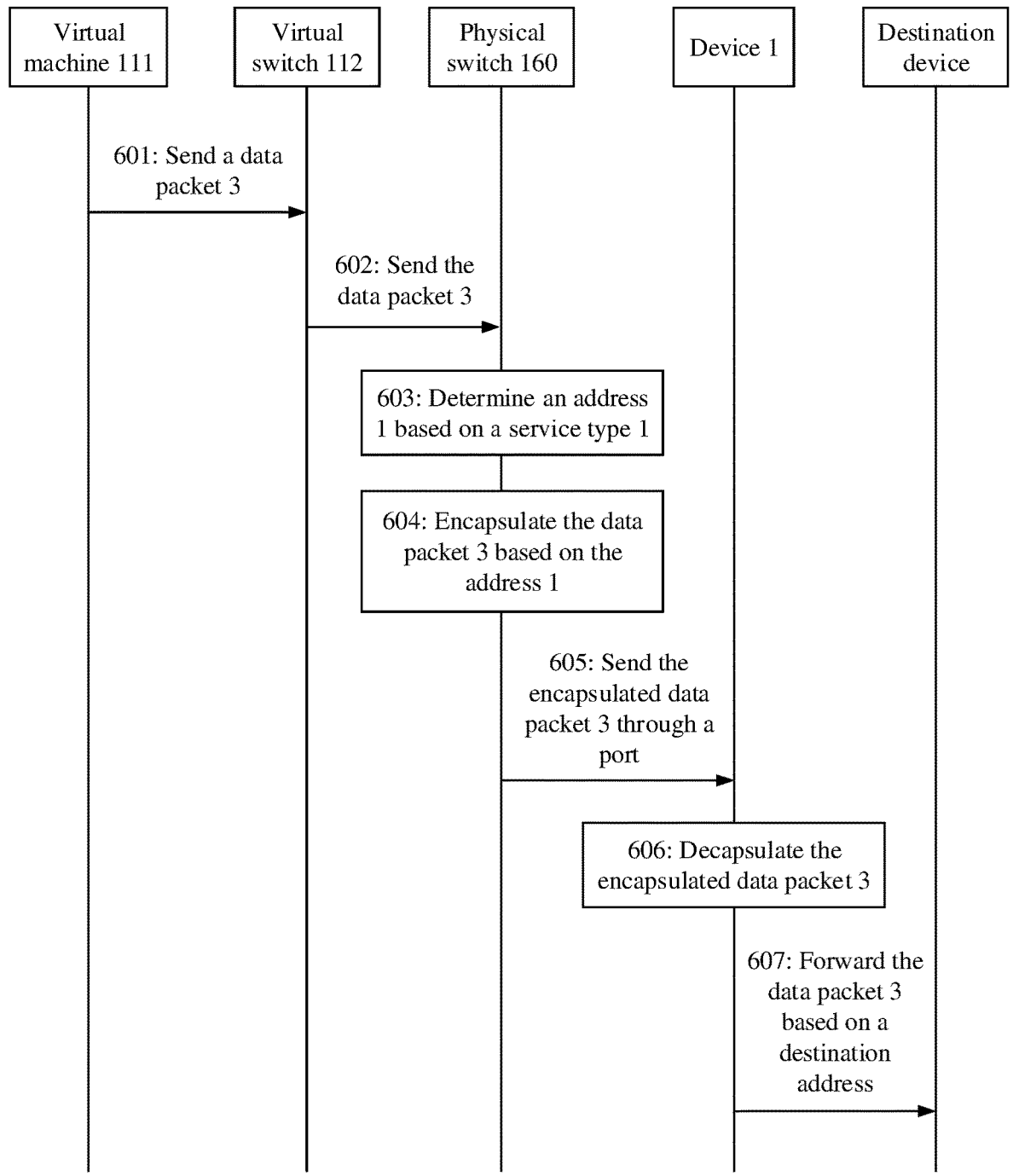
FIG. 6 is a schematic diagram of a data transmission method according to an embodiment of this application.

In the foregoing description, an example in which the virtual switch 112 determines the address 1 based on the service type of the data carried in the payload of the data packet 2, and encapsulates the data packet 2 based on the address 1 is used for description. It should be understood that, in some possible implementations, when a physical switch is deployed at the site 1001, for example, at the site 1001 shown in FIG. 2, the virtual switch 112 may not perform the foregoing operations, but the physical switch 160 at the site 1003 performs the foregoing operations. Specifically, another data transmission provided in this embodiment of this application is described based on the data center shown in FIG. 3 by using an example in which the physical switch 160 in the host 110 transmits a data packet 3 from the virtual machine 111. A service type 1 of data carried in a payload of the data packet 3 corresponds to the link 1 in FIG. 3, and a destination device indicated by a destination address of the data packet 3 is located at the site 1003. The data packet 3 may be forwarded to the destination device through the link 1 by using the following method. As shown in FIG. 6, the method includes the following steps.

Step 601: The virtual machine 111 sends the data packet 3 to the virtual switch 112.

Step 602: After receiving the data packet 3, the virtual switch 112 determines, based on the destination address of the data packet 3, that the data packet 3 needs to be transmitted across sites, and sends the data packet 3 to the physical switch 160.

Step 603: The physical switch 160 determines the service type 1 of the data carried in the payload of the data packet 3, and determines, based on the service type 1, an address, namely, an address 1, for encapsulating the data packet 3. A device 1 indicated by the address 1 is connected to the site 1001 through the link 1.

The physical switch 160 includes a preconfigured forwarding table. The forwarding table records a correspondence between the service type 1 and the address 1. The forwarding table may record a correspondence between each service identifier (the service identifier may indicate a service type) and an address. The physical switch 160 may query the forwarding table configured in the physical switch 160, and determine the address 1 based on the service type 1. The forwarding table in the physical switch 160 may be manually preconfigured, or may be sent by the controller 300 to the physical switch 160 in advance.

Optionally, the physical switch 160 may determine the address 1 based on the service type 1 of the data carried in the payload of the data packet 3 and the destination address of the data packet 3.

The forwarding table in the physical switch 160 may further record a correspondence between a destination address of each data packet and an address, and a correspondence between a service type of data carried in a payload of the data packet and an address. The physical switch 160 may determine the address 1 based on the destination address of the data packet 3 and the service type 1 by querying the forwarding table.

If the forwarding table in the physical switch 160 does not record the correspondence between the service type 1 and the address 1, or does not record the correspondence between the service type 1 and the address 1, and a correspondence between the destination address of the data packet 3 and the address 1, the physical switch 160 may alternatively send a query request to the controller 300, to obtain the address 1 from the controller 300. For a manner in which the physical switch 160 sends the query request to obtain the address 1 from the controller 300, refer to the manner in which the virtual switch 112 sends the query request 1 or the query request 2 to obtain the address 1 from the controller 300 in the embodiment shown in FIG. 5.

Step 604: The physical switch 160 encapsulates the data packet 3 based on the address 1. A packet header of the encapsulated data packet 3 carries the address 1.

Step 605: The physical switch 160 determines a port on the physical switch 160 based on the address 1, and forwards the encapsulated data packet 3 through the determined port. The determined port is connected to the link 1.

For a manner in which the physical switch 160 determines the port on the physical switch 160 based on the address 1, refer to related descriptions of the step 503 in the embodiment shown in FIG. 5.

Step 606: After receiving the encapsulated data packet 3 from a corresponding link, the device 1 decapsulates the encapsulated data packet 3, to obtain the data packet 3. The operation performed by the device 1 in the step 606 is the same as that performed by the device 1 in the step 504.

Step 607: The device 1 forwards, based on the destination address of the data packet 3, the data packet 3 to the destination device indicated by the destination address of the data packet 3. The operation performed by the device 1 in the step 607 is the same as that performed by the device 1 in the step 505.

In the embodiments shown in FIG. 5 and FIG. 6, after receiving the data packet (for example, the data packet 2 or the data packet 3) of the virtual machine 111, the virtual switch 112 or the physical switch 160 may determine the address 1, and transmit the data packet. In a possible implementation, the virtual switch 112 may alternatively determine routing information (for example, a link identifier or an address) corresponding to a service type of the data packet, and notify the physical switch 160 of the routing information, and the physical switch sends the data packet based on the routing information. In other words, the virtual switch 112 and the physical switch 160 may cooperate to transmit the data packet.

Figure 7:
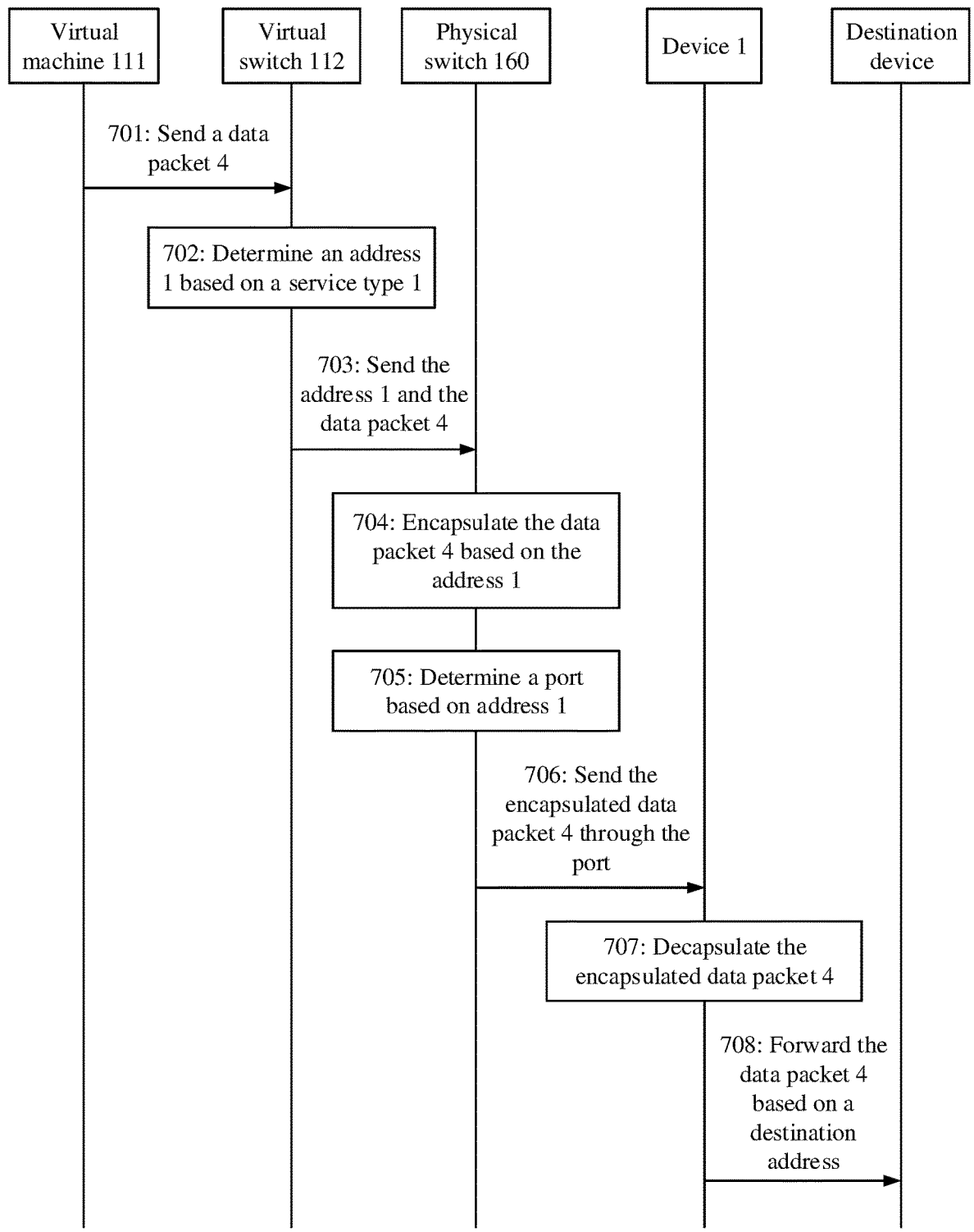
FIG. 7 is a schematic diagram of a data transmission method according to an embodiment of this application.

An embodiment of this application further provides another data transmission method. Based on the data center in FIG. 3, an example in which the virtual switch 112 and the physical switch 160 in the host 110 cooperate to transmit a data packet 4 from the virtual machine 111 is used for description below. A service type 1 of data carried in a payload of the data packet 4 corresponds to the link 1 in FIG. 3. The data packet 4 may be forwarded to a destination device through the link 1 by using the following method. As shown in FIG. 7, the method includes the following steps.

Step 701: The virtual machine 111 sends the data packet 4 to the virtual switch 112.

Step 702: The virtual switch 112 determines the service type 1 of the data carried in the payload of the data packet 4, and determines, based on the service type 1, an address 1 for encapsulating the data packet 4.

For a manner of determining the address 1 by the virtual switch 112, refer to related descriptions in the step 502.

Step 703: The virtual switch 112 sends the address 1 and the data packet 4 to the physical switch 160.

Step 704: The physical switch 160 encapsulates the data packet 4 based on the address 1. A packet header of the encapsulated data packet 4 carries the address 1.

In the step 702, an example in which routing information determined by the virtual switch 112 based on the service type 1 is the address 1 for encapsulating the data packet 4 is used for description. In practice, the routing information determined by the virtual switch 112 based on the service type 1 may also be used to indicate information about the link 1, for example, an identifier of the link 1. In the step 704, the physical switch 160 may determine, based on the identifier of the link 1, the address 1 for encapsulating the data packet 4, and encapsulate the data packet 4 based on the address 1.

A correspondence between the identifier of the link 1 and the address 1 may be recorded in a forwarding table of the physical switch 160. The physical switch may determine the address 1 by querying the forwarding table and by using the identifier of the link 1.

Step 705: The physical switch 160 may determine a port on the physical switch 160 based on the address 1. For a manner of determining the port by the physical switch 160, refer to related descriptions in the step 503.

Optionally, the physical switch 160 may alternatively determine the port on the physical switch 160 based on the identifier of the link 1.

Step 706: The physical switch 160 forwards the encapsulated data packet 4 through the determined port.

Step 707: This step is the same as the step 504.

Step 708: This step is the same as the step 505.

It can be seen from the embodiments shown in FIG. 5 to FIG. 7 that each link between the site 1001 and the site 1003 may correspond to one or more different service types. A correspondence between each link and a service type is reflected by routing information (for example, an address and a link identifier) determined based on the service type. For example, the routing information may be an address of a device on a link corresponding to the service type, or may be information that may indicate a link, for example, an identifier of the link.

Data packets of some service types have high security requirements, and transmission security of data needs to be ensured during transmission. Therefore, the data packets of these service types are not easily intercepted by an attacker, and may be encrypted. For example, for a service having a high security requirement, for example, a financial service, an encryption algorithm with a relatively high encryption level, for example, a secure sockets layer (SSL) or an internet protocol security (IPsec), is used for a data packet of the service type. For a service having no special security requirement, for example, a video service, a data packet of the service type may not be encrypted. In addition, an encryption policy may be used for data packets carrying different destination addresses.

In a possible implementation, before encapsulating the data packet 2, the virtual switch 112 may further determine an encryption policy 1 based on the service type 1 and/or the destination address of the data packet 2, and encrypt the data packet 2 according to the encryption policy 1.

Optionally, in addition to representing the foregoing correspondence, the forwarding flow table in the virtual switch 112 may further include an encryption policy (for example, the encryption policy 1 in this embodiment of this application), and the encryption policy indicates whether encryption needs to be performed and a corresponding encryption algorithm.

Correspondingly, after receiving the encrypted data packet 2, the virtual switch at the site 1003 may query the forwarding flow table, and determine a decryption policy 1 based on the service type and/or the destination address. Because the encryption policy is relative to the decryption policy, the virtual switch at the site 1003 may decrypt the encrypted data packet 2 according to the decryption policy 1.

Optionally, after sending the data packet 2 to the virtual switch 112, the virtual machine 111 may further send the data packet 3 that has a same service type and carries a same destination address and a same source address. After receiving the data packet 3, the virtual switch 112 queries the forwarding flow table, and if it is determined that data deduplication needs to be performed on a data packet of the service type, data deduplication needs to be performed on the data packet 3.

It should be noted that in some scenarios, one virtual machine may send a plurality of data packets to a virtual switch within a specific time period. These data packets have same service types, and carry same destination addresses and same source addresses. In addition, data carried in these data packets has a relatively small difference. In this case, to accelerate a data transmission process, data deduplication may be performed on a subsequent data packet after a first complete data packet is sent. For example, data that is the same as that in the first data packet may be removed from the subsequent data packet, and only a differential packet carrying differential data is sent. In this embodiment of this application, a process of removing the data that is the same as that in the first data packet from the subsequent data packet is referred to as data deduplication.

Specifically, the virtual switch 112 compares the data packet 2 with a data packet 5, determines differential data between payload data of the data packet 2 and payload data of the data packet 5, and generates a differential packet carrying the differential data. A service type of the differential packet is the same as the service type of the data packet 2, and the differential packet carries a same destination address and a same source address.

To distinguish between a complete data packet and a differential packet generated after data deduplication, the differential packet may carry identification information of the differential packet, to indicate that the packet is a differential packet after data deduplication, and payload data carried in the differential packet is differential data.

The differential packet may further indicate a differential location between the data packet 5 and the data packet 2, to determine a location, in the data packet 2, of the differential data carried in the differential packet. For example, sizes of data carried in the data packet 5 and the data packet 2 are 100 bytes, where the $20^{th}$ byte to the $30^{th}$ byte are different. The differential packet may indicate that the differential location between the data packet 5 and the data packet 2 is located between the $20^{th}$ byte and the $30^{th}$. Alternatively, the differential packet may indicate that a differential start location between the data packet 5 and the data packet 2 is the $20^{th}$ byte. A manner in which the differential packet indicates the differential location between the data packet 5 and the data packet 2 is not limited in this embodiment of this application. The foregoing manner is an example.

A quantity of the data packets 5 is not limited in this embodiment of this application. The virtual machine may send a plurality of data packets 5 to the virtual switch 112. The virtual switch 112 may generate a corresponding differential packet based on each data packet 5 and the data packet 2, and one data packet 5 corresponds to one differential packet.

To distinguish between a plurality of differential packets, the differential packet may further indicate a sequence of sending the differential packet, and indicate a sequence number of the differential packet sent after the data packet 2. An indication manner is not limited in this embodiment of this application. For example, the differential packet may carry a numeric identifier, and a numeric value indicates the sequence of sending the differential packet. For example, the virtual machine sends three data packets 5 to the virtual switch 112. The virtual switch 112 generates a first differential packet based on the first data packet 5, and carries a data identifier 1 indicating that the differential packet is the first differential packet sent after the data packet 2. The virtual switch 112 generates a second differential packet based on the second data packet 5, and carries a data identifier 2 indicating that the differential packet is the second differential packet sent after the data packet 2.

Similarly, when a differential packet is sent, the differential packet may also be encapsulated based on the address 1 in a manner the same as that of sending the data packet 2, and the differential packet is sent to a corresponding link based on the address 1. In addition, the differential packet may be encrypted according to the encryption policy 1.

In addition, after receiving the differential packet, the virtual switch at the site 1003 needs to perform data restoration on the differential packet to generate the data packet 5, and forward the data packet 5 to a destination device.

In a possible implementation, the virtual switch at the site 1003 may alternatively determine, based on identifier information of the differential packet, that the packet is a differential packet after data deduplication.

When performing data restoration on the differential packet, the virtual switch at the site 1003 may replace, based on a differential location that is between the data packet 2 and the data packet 5 and that is indicated by the differential packet, data of the data packet 2 at the differential location with differential data carried in the differential packet, to generate the data packet 5.

Before the virtual switch at the site 1003 restores the data packet 5 based on the differential packet and the data packet 2, if both the differential packet and the data packet 2 are encrypted, the virtual switch at the site 1003 may further decrypt the differential packet and the data packet 2. The virtual switch at the site 1003 queries the forwarding flow table based on a destination address and/or a service type, to determine the encryption policy 1.

Because an encryption algorithm corresponds to a decryption algorithm, after the encryption policy is learned, a corresponding decryption policy may be determined. The virtual switch at the site 1003 may decrypt the data packet 2 and the differential packet according to the encryption policy 1.

In the foregoing description, encryption of the data packet 2 and determining of differential data between the data packet 2 and the data packet 5 are both performed by the virtual switch 112. It should be understood that in some possible implementations, the virtual switch 112 may not perform the foregoing operations, but the physical switch 160 at the site 1003 performs the foregoing operations. For example, in the embodiment shown in FIG. 6, after receiving the data packet 3, the virtual switch 112 may send the data packet 3 to the physical switch 160. After receiving the data packet 3, the physical switch 160 may determine an encryption policy based on the service type 1 of the data carried in the payload of the data packet 3, and encrypt the data packet 3 according to the encryption policy. When receiving the data packet 5, the physical switch 160 may parse the data packet 3 and the data packet 5, to determine differential data and generate a differential packet, and send the differential packet in a manner the same as that of sending the data packet 3. For example, in the embodiment shown in FIG. 7, after receiving the data packet 4, the virtual switch 112 may send the data packet 4 and the address 1 to the physical switch 160. After receiving the data packet 4, the physical switch 160 may determine an encryption policy based on the service type 1 of the data carried in the payload of the data packet 4, and encrypt the data packet 4 according to the encryption policy. When receiving the data packet 5, the physical switch 160 may parse the data packet 4 and the data packet 5, to determine differential data and generate a differential packet, and send the differential packet in a manner the same as that of sending the data packet 4.

Figure 8:
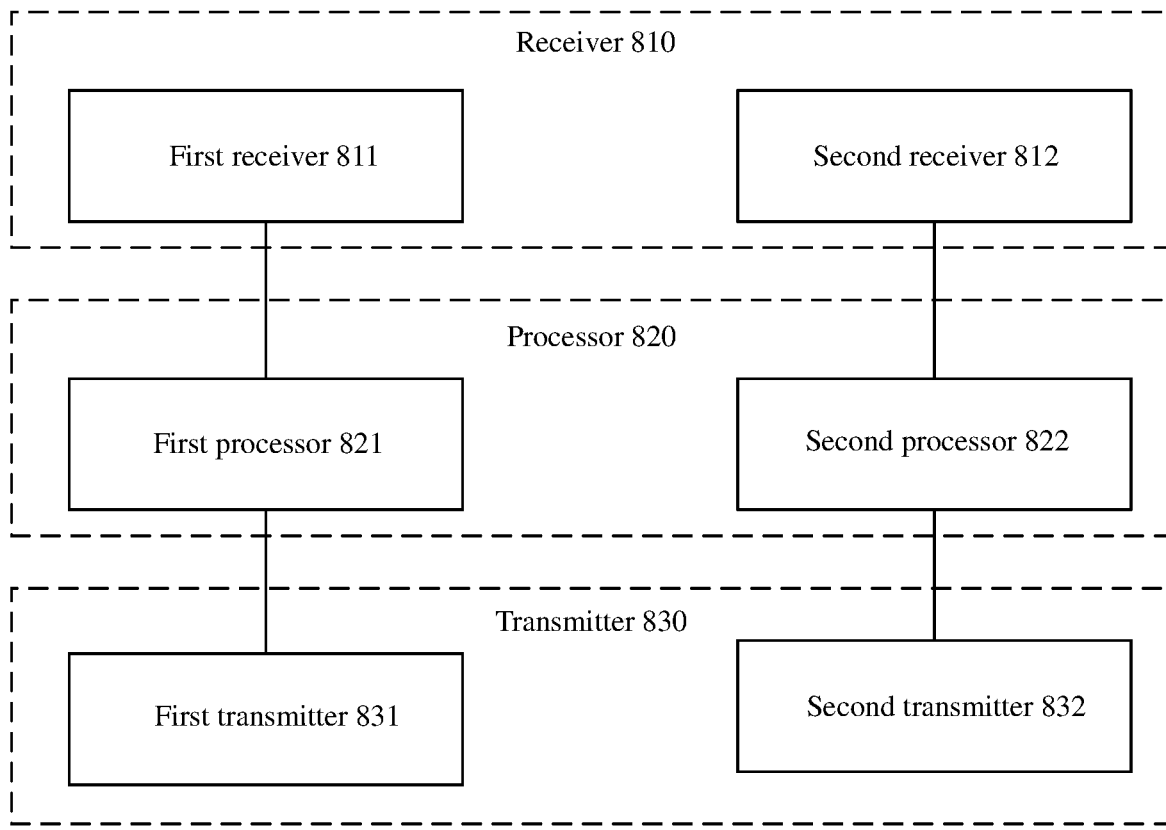
FIG. 8 is a schematic diagram of a structure of a switch according to an embodiment of this application.

Based on a same inventive concept as the method embodiments, an embodiment of this application further provides a switch, configured to perform the method performed by the virtual switch 112 in the step 501 to the step 503 in the method embodiment shown in FIG. 5, or perform the method performed by the physical switch 160 in the step 602 to the step 605 in the method embodiment shown in FIG. 6, or perform the method performed by the virtual switch 112 and the physical switch 160 that are in the step 701 to the step 706 in the method embodiment shown in FIG. 7. For related features, refer to the foregoing method embodiments. As shown in FIG. 8, the switch is located at a first site in a data center, the data center further includes a second site, at least two links are established between the first site and the second site, and each link corresponds to at least one service type. The switch includes a receiver 810, a processor 820, and a transmitter 830.

The receiver 810 is configured to obtain a first data packet sent by a virtual machine at the first site.

The processor 820 is configured to identify a service type of the first data packet, and determine routing information of the first data packet based on the service type of the first data packet. The routing information is used to indicate a bearer link for transmitting the first data packet.

The transmitter 830 is configured to send the first data packet based on the routing information. The first data packet is transmitted to the second site through the bearer link.

In a possible implementation, after determining the routing information of the first data packet based on the identified service type, the processor 820 may encapsulate the first data packet, and the routing information is located in a packet header of the encapsulated first data packet. Then, the transmitter 830 may send the encapsulated first data packet based on the routing information.

In a possible implementation, the transmitter 830 further includes a plurality of ports, and each port is connected to one of at least two links. For example, the switch may be the physical switch 160 shown in FIG. 3, and the physical switch 160 may perform the method performed by the physical switch 160 in the embodiment shown in FIG. 6. Alternatively, the switch may be the virtual switch 122 shown in FIG. 4, and the virtual switch 122 may perform the method performed by the virtual switch 122 in the embodiment shown in FIG. 5. When forwarding the first data packet, the transmitter 830 may determine a forwarding port of the encapsulated first data packet based on the routing information, and forward the encapsulated first data packet through the forwarding port.

In a possible implementation, the switch includes a virtual switch and a physical switch. The virtual switch may perform the method performed by the virtual switch 112 in the embodiment shown in FIG. 5, and the physical switch may perform the method performed by the physical switch 160 in the embodiment shown in FIG. 5. For example, the virtual switch includes a first transmitter 831, a first processor 821, and a first receiver 811. The physical switch includes a second transmitter 832, a second processor 822, and a second receiver 812. The second transmitter 832 includes a plurality of ports of the physical switch, and each port is connected to one of the at least two links.

For example, in the virtual switch, the first receiver 811 first obtains the first data packet sent by the virtual machine. Then, the first processor 821 identifies the service type of the first data packet, and determines the routing information of the first data packet based on the service type of the first data packet, and may encapsulate the first data packet based on the routing information. After encapsulation of the first data packet is completed, the first transmitter 831 may send the encapsulated first data packet to the physical switch, to be specific, the second receiver 812 in the physical switch.

In the physical switch, after the second receiver 812 receives the encapsulated first device packet, the second processor 822 may determine the forwarding port of the encapsulated first data packet based on the routing information. Then, the second transmitter 832 forwards the encapsulated first data packet through the forwarding port.

In a possible implementation, the switch includes a virtual switch and a physical switch. The virtual switch may perform the method performed by the virtual switch 112 in the embodiment shown in FIG. 7, and the physical switch may perform the method performed by the physical switch 160 in the embodiment shown in FIG. 7. The virtual switch includes a first transmitter 831, a first processor 821, and a first receiver 811. The physical switch includes a second transmitter 832, a second processor 822, and a second receiver 812. The second transmitter 832 includes a plurality of ports of the physical switch, and each port is connected to one of the at least two links.

For example, in the virtual switch, the first receiver 811 first obtains the first data packet sent by the virtual machine. Then, the first processor 821 may identify the service type of the first data packet, and determine the routing information of the first data packet based on the service type of the first data packet. Then, the first transmitter 831 may send the routing information and the first data packet to the second receiver 812.

For example, in the physical switch, after the second receiver 812 receives the routing information and the first data packet, the second processor 822 may encapsulate the first data packet based on the routing information, and determine a forwarding port of the encapsulated first data packet based on the routing information. Then, the second transmitter 832 forwards the encapsulated first data packet through the forwarding port.

In a possible implementation, the transmitter 830 (or the first transmitter 831) may send a query request to a controller in the data center. The query request carries the service type of the first data packet. Then, the receiver 810 (or the first receiver 811) receives a query response returned by the controller. The query response carries the routing information.

In a possible implementation, the processor 820 (or the first processor 821) may further identify a destination address of the first data packet, and may add the destination address of the first data packet to the query request, and the transmitter 830 (or the first transmitter 831) sends the query request to the controller.

In a possible implementation, before the transmitter 830 sends the first data packet based on the routing information, the processor 820 (the first processor 821 or the second processor 822) may encrypt the first data packet. For example, the processor determines an encryption policy based on the service type, and then encrypts the first data packet according to the encryption policy.

In a possible implementation, the switch may further perform data deduplication. For example, the receiver 810 (the first receiver 811 or the second receiver 812) may obtain a second data packet sent by the virtual machine. The second data packet and the first data packet have a same service type and a same destination address. The processor 820 (the first processor 821 or the second processor 822) may determine differential data between the first data packet and the second data packet. The transmitter 830 (the first transmitter 831 or the second transmitter 832) sends the differential data based on the routing information. The differential data is transmitted to the second site through the bearer link.

It should be noted that, in this embodiment of this application, unit division is exemplary, and is merely a logical function division. In actual implementation, another division manner may be used. Functional units in the embodiments of this application may be integrated into one processor, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 9:
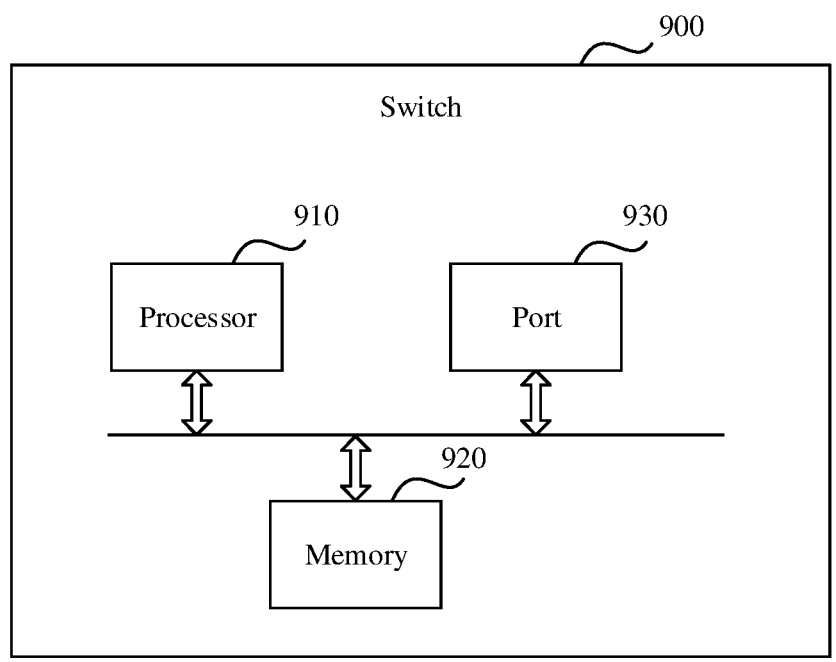
FIG. 9 is a schematic diagram of a structure of a switch according to an embodiment of this application.

In a simple embodiment, a person skilled in the art may figure out that the switch may be in a form shown in FIG. 9.

A switch 900 shown in FIG. 9 includes at least one processor 910 and a memory 920, and optionally may further include a port 930.

The memory 920 may be a volatile memory, for example, a random access memory. Alternatively, the memory may be a non-volatile memory, for example, a read-only memory, a flash memory, a hard disk drive (HDD), or a solid-state drive (SSD). Alternatively, the memory 920 is any other medium that can be used to carry or store expected program code in a command or data structure form and that can be accessed by a computer. However, this is not limited thereto. The memory 920 may be a combination of the foregoing memories.

In this embodiment of this application, a specific connection medium between the processor 910 and the memory 920 is not limited.

The apparatus shown in FIG. 9 further includes the port 930 (only one port is shown as an example in FIG. 9, and it should be understood that the switch 900 may include a plurality of ports), configured to connect to another device. When the processor 910 communicates with the another device, data transmission may be performed through the port 930.

When the switch uses the form shown in FIG. 9, the processor 910 in FIG. 9 may invoke one or more computer-executable instructions stored in the memory 920, so that the switch 900 may perform the method in any one of the foregoing method embodiments. For example, the switch 900 may perform the method performed by the virtual switch 112 in the step 501 to the step 503 in the method embodiment shown in FIG. 5, or perform the method performed by the physical switch 160 in the step 602 to the step 605 in the method embodiment shown in FIG. 6, or perform the method performed by the virtual switch 112 and the physical switch 160 in the step 701 to the step 706 in the method embodiment shown in FIG. 7.

Specifically, functions/implementation processes of the transmitters, the receivers, and the processors in FIG. 8 may be implemented by the processor 910 in FIG. 9 by invoking the computer-executable instructions stored in the memory 920. Alternatively, functions/implementation processes of the processors in FIG. 8 may be implemented by the processor 910 in FIG. 9 by invoking the computer-executable instructions stored in the memory 920, and functions/implementation processes of the transmitters and the receivers in FIG. 8 may be implemented through the port 930 in FIG. 9.

In a possible implementation, specifically, functions/implementation processes of the first transmitter, the first receiver, and the first processor in FIG. 8 may be implemented by the processor 910 in FIG. 9 by invoking the computer-executable instruction stored in the memory 920. Alternatively, a function/an implementation process of the first processor in FIG. 8 may be implemented by the processor 910 in FIG. 9 by invoking the computer-executable instructions stored in the memory 920, and functions/implementation processes of the first transmitter and the first receiver in FIG. 8 may be implemented through the port 930 in FIG. 9.

In a possible implementation, specifically, functions/implementation processes of the second transmitter, the second receiver, and the second processor in FIG. 8 may be implemented by the processor 910 in FIG. 9 by invoking the computer-executable instructions stored in the memory 920. Alternatively, a function/an implementation process of the second processor in FIG. 8 may be implemented by the processor 910 in FIG. 9 by invoking the computer-executable instructions stored in the memory 920, and functions/implementation processes of the second transmitter and the second receiver in FIG. 8 may be implemented through the port 930 in FIG. 9.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:

1. A data transmission method performed by a switch located at a data center, wherein the data center comprises a first site and a second site, at least two links are established between the first site and the second site, each link corresponds to at least one service type, and the method comprises:
  obtaining, by the switch, a first data packet sent by a virtual machine, wherein the switch and the virtual machine are located at the first site;
  identifying, by the switch, a service type of the first data packet;
  determining, by the switch, routing information of the first data packet based on the service type of the first data packet, wherein the routing information indicates a bearer link for transmitting the first data packet;
  sending, by the switch, the first data packet to the second site based on the routing information, wherein the first data packet is transmitted to the second site through the bearer link;
  obtaining, by the switch, a second data packet of the virtual machine, wherein the second data packet and the first data packet have a same service type and a same destination address;
  determining, by the switch, differential data between the first data packet and the second data packet; and
  sending, by the switch, the differential data to the second site based on the routing information, wherein the differential data is transmitted to the second site through the bearer link.

2. The data transmission method according to claim 1, further comprising, after the determining, by the switch, routing information of the first data packet based on the identified service type,
  encapsulating, by the switch, the first data packet based on the routing information, wherein the routing information is carried in a packet header of the encapsulated first data packet; and
  the sending, by the switch, the first data packet to the second site based on the routing information comprises:
  sending, by the switch, the encapsulated first data packet to the second site based on the routing information.

3. The data transmission method according to claim 2, wherein the switch comprises a plurality of ports, each port is connected to one of the at least two links, and the sending, by the switch, the encapsulated first data packet to the second site based on the routing information comprises:
  determining, by the switch, a forwarding port of the encapsulated first data packet based on the routing information, and forwarding the encapsulated first data packet to the second site through the forwarding port.

4. The data transmission method according to claim 1, wherein the switch comprises a virtual switch and a physical switch that are at the first site, the physical switch comprises a plurality of ports, each port is connected to one of the at least two links, and the method further comprises:
  obtaining, by the virtual switch, the first data packet sent by the virtual machine;
  identifying, by the virtual switch, the service type of the first data packet;
  determining, by the virtual switch, the routing information of the first data packet based on the service type of the first data packet;
  encapsulating, by the virtual switch, the first data packet based on the routing information, and sending the encapsulated first data packet to the physical switch; and
  determining, by the physical switch, a forwarding port of the encapsulated first data packet based on the routing information, and forwarding the encapsulated first data packet through the forwarding port.

5. The data transmission method according to claim 1, wherein the switch comprises a virtual switch and a physical switch that are at the first site, the physical switch comprises a plurality of ports, each port is connected to one of the at least two links, and the method further comprises:
  obtaining, by the virtual switch, the first data packet sent by the virtual machine;
  identifying, by the virtual switch, the service type of the first data packet;
  determining, by the virtual switch, the routing information of the first data packet based on the service type of the first data packet;
  sending, by the virtual switch, the routing information and the first data packet to the physical switch; and
  encapsulating, by the physical switch, the first data packet based on the routing information, determining a forwarding port of the encapsulated first data packet based on the routing information, and forwarding the encapsulated first data packet through the forwarding port.

6. The data transmission method according to claim 1, wherein the data center further comprises a controller, the controller stores configuration information of the at least two links between the first site and the second site and a connection relationship between internal devices at each site; and the determining, by the switch, routing information of the first data packet based on the service type of the first data packet comprises:
sending, by the switch, a query request to the controller, wherein the query request carries the service type of the first data packet; and
receiving, by the switch, a query response returned by the controller, wherein the query response carries the routing information.

7. The data transmission method according to claim 6, further comprising:
identifying, by the switch, a destination address of the first data packet; and the query request further carries the destination address of the first data packet.

8. The method according to claim 1, further comprising, before the sending, by the switch, the first data packet based on the routing information,
determining, by the switch, an encryption policy based on the service type, and encrypting, by the switch, the first data packet based on the encryption policy.

9. A switch located at a first site in a data center, wherein the data center further comprises a second site, at least two links are established between the first site and the second site, each link corresponds to at least one service type, the switch comprises at least one memory and at least one processor,
the at least one memory is configured to store computer program instructions that, when executed by the at least one processor, cause the switch to:
obtain a first data packet sent by a virtual machine, wherein the switch and the virtual machine are located at the first site;
identify a service type of the first data packet;
determine routing information of the first data packet based on the service type of the first data packet, wherein the routing information indicates a bearer link for transmitting the first data packet;
send the first data packet to the second site based on the routing information, wherein the first data packet is transmitted to the second site through the bearer link;
obtain a second data packet of the virtual machine, wherein the second data packet and the first data packet have a same service type and a same destination address;
determine differential data between the first data packet and the second data packet; and
send the differential data based on the routing information, wherein the differential data is transmitted to the second site through the bearer link.

10. The switch according to claim 9, wherein sending the first data packet to the second site comprises:
after determining the routing information of the first data packet based on the identified service type,
encapsulating the first data packet based on the routing information, wherein the routing information is carried in a packet header of the encapsulated first data packet, and sending the encapsulated first data packet to the second site based on the routing information.

11. The switch according to claim 10, wherein the switch further comprises a plurality of ports, each port is connected to one of the at least two links, and the at least one processor is further configured to:
determine a forwarding port of the encapsulated first data packet based on the routing information, and forward the encapsulated first data packet to the second site through the forwarding port.

12. The switch according to claim 10, wherein the switch comprises a virtual switch and a physical switch; the virtual switch comprises a first processor in the at least one processor and a first memory in the at least one memory; the physical switch comprises a second processor in the at least one processor and a second memory in the at least one memory; the physical switch further comprises a plurality of ports, and each port is connected to one of the at least two links; the first memory is configured to store a first set of computer storage instructions that, when executed by the first processor, cause the first processor to:
obtain the first data packet sent by the virtual machine; identify the service type of the first data packet,
determine the routing information of the first data packet based on the service type of the first data packet, and
encapsulate the first data packet based on the routing information, and send the encapsulated first data packet to the second processor; and
the second memory is configured to store a second set of computer storage instructions that, when executed by the second processor, cause the second processor to:
receive the encapsulated first data packet, determine a forwarding port of the encapsulated first data packet based on the routing information, and forward the encapsulated first data packet to the second site through the forwarding port.

13. The switch according to claim 9, wherein the switch comprises a virtual switch and a physical switch, the virtual switch comprises a first processor in the at least one processor and a first memory in the at least one memory; the physical switch comprises a second processor in the at least one processor and a second memory in the at least one memory; the physical switch further comprises a plurality of ports, each port is connected to one of the at least two links;
the first memory is configured to store a third set of computer storage instructions that, when executed by the first processor, cause the first processor to:
obtain the first data packet sent by the virtual machine; identify the service type of the first data packet,
determine the routing information of the first data packet based on the service type of the first data packet, and
send the routing information and the first data packet to the second processor; and
the second memory is configured to store a fourth set of computer storage instructions that, when executed by the second processor, cause the second processor to:
receive the routing information and the first data packet, encapsulate the first data packet based on the routing information, determine a forwarding port of the encapsulated first data packet based on the routing information, and forward the encapsulated first data packet to the second site through the forwarding port.

14. The switch according to claim 9, wherein the at least one processor is further configured to:
send a query request to a controller of the data center, wherein the query request carries the service type of the first data packet; and receive a query response returned by the controller, wherein the query response carries the routing information.

15. The switch according to claim 14, wherein the at least one processor is further configured to identify a destination address of the first data packet; and the query request further carries the destination address of the first data packet.

16. The switch according to claim 9, wherein the at least one processor is further configured to, before sending the first data packet to the second site based on the routing information, determine an encryption policy based on the service type, and encrypt the first data packet based on the encryption policy.

17. A first site located in a data center, wherein the data center further comprises a second site, at least two links are established between the first site and the second site; each link corresponds to at least one service type; the first site comprises a switch and a virtual machine;

the virtual machine is configured to send a first data packet to the switch; and the switch is configured to: receive the first data packet, identify a service type of the first data packet, determine routing information of the first data packet based on the service type of the first data packet, the routing information indicating a bearer link for transmitting the first data packet, and send the first data packet to the second site based on the routing information, the first data packet being transmitted to the second site through the bearer link, obtain a second data packet of the virtual machine, wherein the second data packet and the first data packet have a same service type and a same destination address; determine differential data between the first data packet and the second data packet; and send the differential data based on the routing information, wherein the differential data is transmitted to the second site through the bearer link.

18. The first site according to claim 17, wherein sending the first data packet based on the routing information comprises:

encapsulating the first data packet based on the routing information, wherein the routing information is carried in a packet header of the encapsulated first data packet; and sending the encapsulated first data packet to the second site based on the routing information.

* * * * *

UNITED STATES PATENT AND TRADEMARK OFFICE
CERTIFICATE OF CORRECTION

| | |
|---|---|
| PATENT NO. | : 11,870,701 B2 |
| APPLICATION NO. | : 17/562115 |
| DATED | : January 9, 2024 |
| INVENTOR(S) | : Yu Zhang et al. |

It is certified that error appears in the above-identified patent and that said Letters Patent is hereby corrected as shown below:

On the Title Page

Change "(73) Assignee: "HUAWEI TECHNOLOGIES CO., LTD., Guangdong (CN)" to "(73) Assignee: "HUAWEI CLOUD COMPUTING TECHNOLOGIES CO., LTD., GUI'AN NEW DISTRICT (CN)".

Signed and Sealed this
Sixth Day of August, 2024

Katherine Kelly Vidal
*Director of the United States Patent and Trademark Office*